Figure 1:
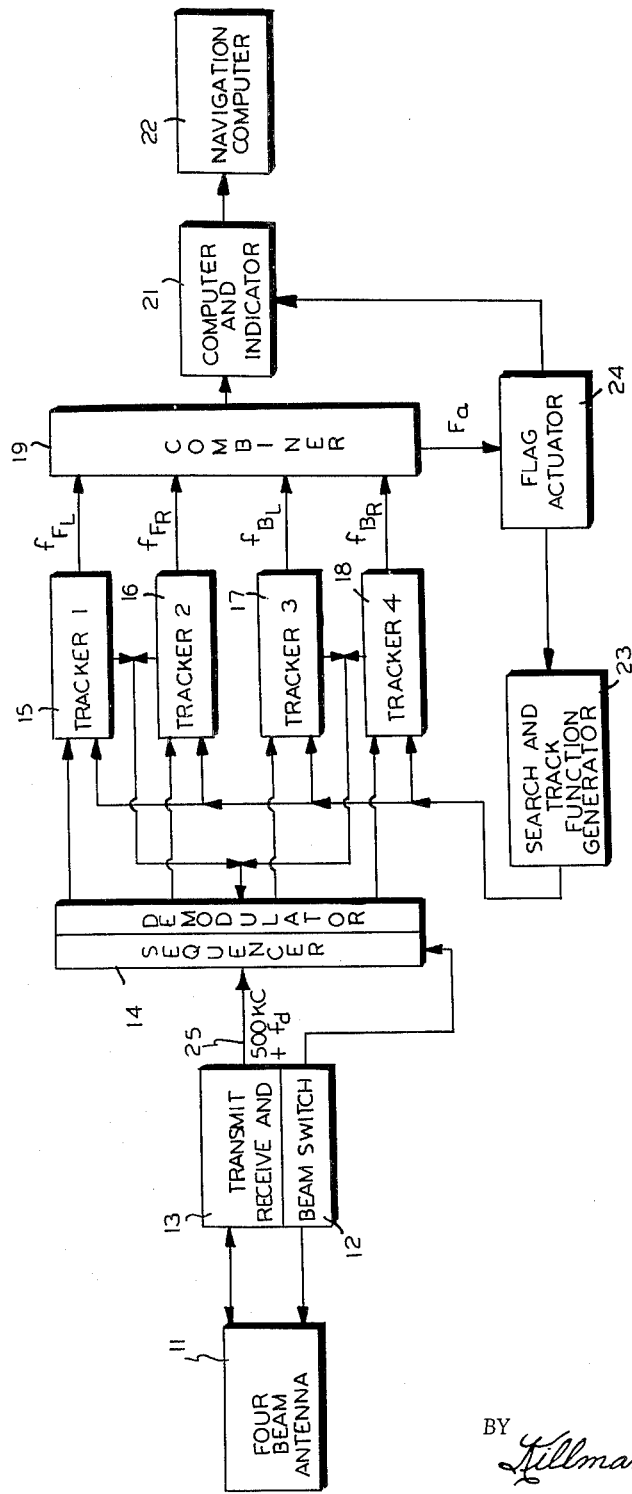

Aug. 24, 1965  R. L. BRANDAO  3,202,987
RAPID SLEW INITIATION CIRCUIT
Filed May 24, 1962  3 Sheets-Sheet 1

INVENTOR
RUY L. BRANDAO

BY *Killman, Smith & Lamb*
ATTORNEYS

Aug. 24, 1965

R. L. BRANDAO 3,202,987

RAPID SLEW INITIATION CIRCUIT

Filed May 24, 1962

3 Sheets-Sheet 2

INVENTOR
RUY L. BRANDAO

BY Killman, Smith & Lamb
ATTORNEYS

United States Patent Office 3,202,987
Patented Aug. 24, 1965

3,202,987
RAPID SLEW INITIATION CIRCUIT
Ruy Lester Brandao, Baltimore, Md., assignor to The Bendix Corporation, Baltimore, Md., a corporation of Delaware
Filed May 24, 1962, Ser. No. 197,431
3 Claims. (Cl. 343—9)

This invention relates generally to Doppler navigation systems and more particularly to improved frequency tracking oscillator circuits and frequency lock detector circuits useful in Doppler systems.

The present invention is disclosed as an improvement in a portion of the system disclosed and claimed in the co-pending application of Gunkel et al., Serial No. 845,034, filed October 7, 1959, and the application of B. L. Cordry, Ser. No. 197,306, filed of even date, both assigned to the assignee of the present invention. In the co-pending application of Gunkel et al., a Doppler navigation system is disclosed and claimed which utilizes an antenna fixed relative to the aircraft and which produces sequentialy four downwardly directed beams positioned symmetrically in the four quadrants defined by the horizontal longitudinal and transverse coordinates of the aircraft. The Doppler data developed from each of the beams is translated into an equivalent Doppler center spectrum frequency generated by four local tracking oscillators operated to provide a distinct frequency corresponding to the center of the spectrum of the Doppler energy returned on each of the beams. This tracker oscillator frequency for each of the four beams is combined by various algebraic manipulations to produce other frequencies which are utilized to derive ground speed and drift angle data and produce indications of these quantities therefrom.

In frequency trackers of the prior art, it has been found that the limiting factor in system sensitivity is the ability to determine whether or not the oscillator is actually tracking a returned Doppler signal. This limitation results from the fact that the trackers utilize correlation and synchronous demodulation techniques and hence are capable of operation with signals that are appreciably below the noise level and hence the track lock detector which is attempting to operate on an amplitude detected signal is the limiting factor in the system operation. Under these conditions, the full capabilities of a tracking oscillator may not be realized since the data from such an oscillator can only reliably be used when one is certain that the oscillator is tracking. In actual practice it has been found that the system is capable of producing useful data from signals well below the lower signal level at which the prior art frequently lock detectors could be relied upon to assure that the data from the tracking oscillator was good. On the other hand, any attempt to utilize the data from the tracking oscillator below the level at which the lock detector would indicate that the data was good might result in an actual reliance upon bad data, since the tracking oscillator would continue to produce an output frequency even though the input signal thereto had completely disappeared.

In order to overcome the limitations of prior frequency lock detectors and tracking oscillator systems, the present invention utilizes a unique feature of a fixed antenna beam position Doppler system which provides a combination of frequencies that is always substantially zero whenever correct data are being received on all four of the beams of the Doppler system. Since this frequency is always zero if the data on all beams are correct data, the occurrence of an error in the output of any tracking oscillator for any beam changes this unique frequency combination from zero to some frequency greater than zero by an amount depending upon the error in the data. Thus by detecting when this unique frequency is higher than a predetermined value, say, of 500 cycles, a reliable indication is available that one or more of the tracking oscillators is not tracking. The present invention utilizes this indication to initiate slewing of the tracking oscillators in order that the correct tracking operation can be reattained while at the same time preserving the last good data by freezing the servos which read out the data to the indicators and navigation instruments.

A further improvement is provided by the present invention by periodically introducing a perturbation in the tracking oscillators of such short duration that the time constants of the tracking circuit do not register the deviation if the oscillator is tracking properly. This is possible since for proper tracking operation the oscillator will return to the correct frequency rapidly after being deviated by the small amount involved in the perturbation. If, however, the oscillator is merely operating with a zero signal input, it will not track back to its original value after being deviated and, hence, will introduce a new frequency into the alarm frequency combination for an extended period of time until the next deviation caused by the periodic perturbations. These deviations are cumulative in the absence of tracking a signal which restores the oscillator frequency. Thus, the system not only provides a sensitive frequency lock detection but also prevents erroneous operation where the data has disappeared after the system has once acquired signals. In the absence of this last feature the system would tend to continue to operate as though receiving usable signals after such signals had disappeared.

It is accordingly the principal object of the present invention to provide an improved Doppler navigation system with rapid initiation of slewing whenever the tracking oscillators are not tracking.

These and other objects of the invention will appear from the following detailed description taken in conjunction with the accompanying drawings wherein:

FIG. 1 is a block diagram of a complete Doppler navigation system; and

Figure 2A:
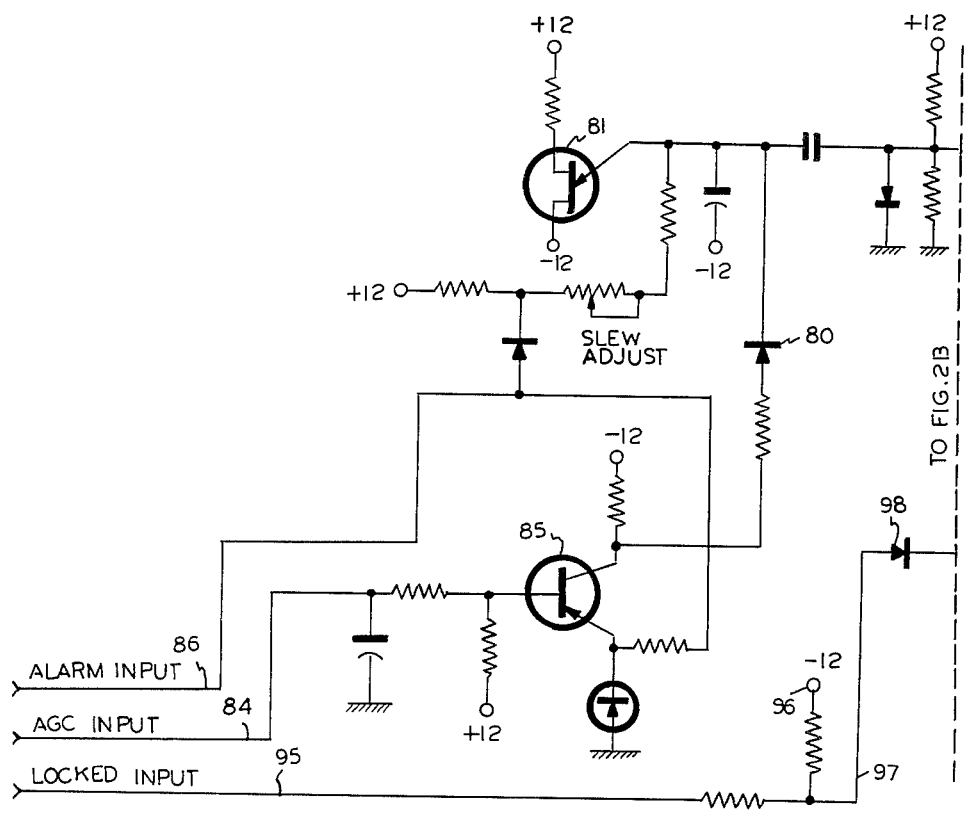
Figure 2B:
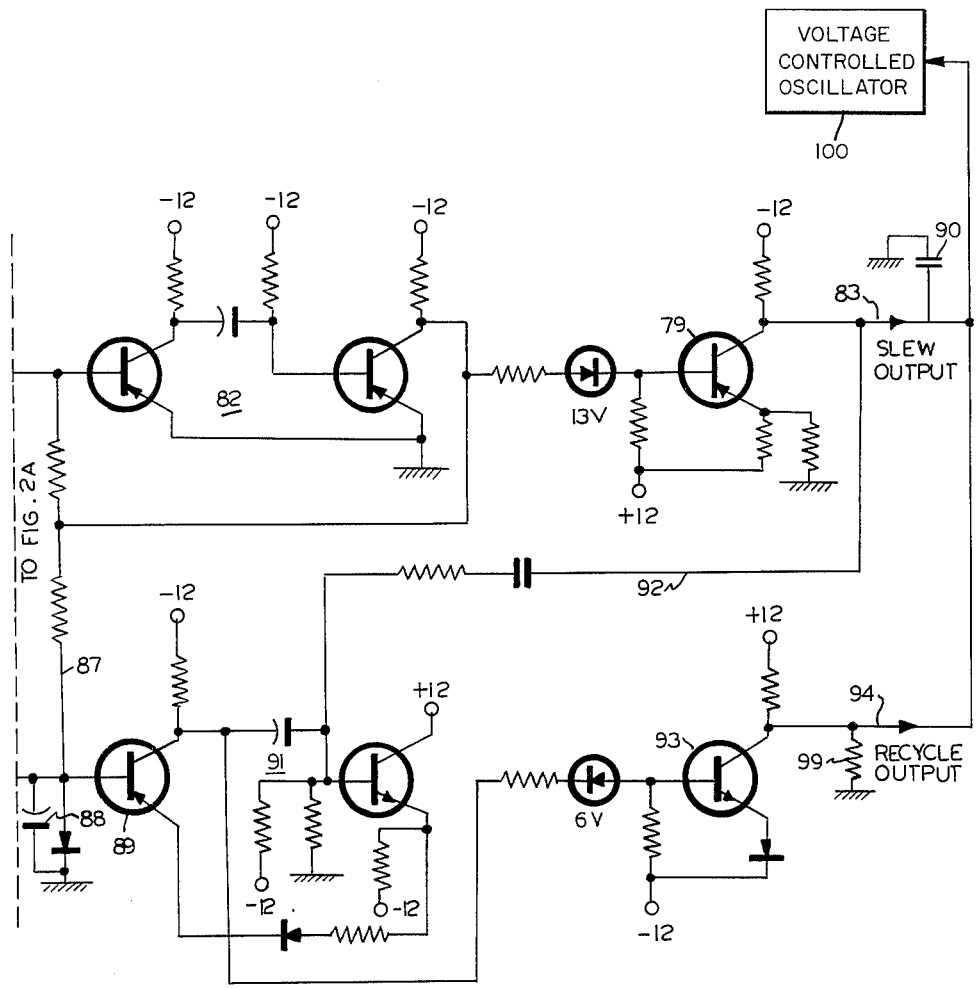

FIGS. 2A and 2B taken together are the circuit for the search and track function generator.

Referring now to FIG. 1, the general description of the system will be given, reference being made to the aforementioned Gunkel et al., application incorporated herein by reference for a detailed understanding of the system. The system includes a four-beam antenna 11 which is operated to produce sequentially four distinct beam positions relative to the aircraft. For this purpose a beam switch control device 12 is provided in conjunction with the transmit and receive portion of the circuit 13 for carrying on the transmisssion of microwave energy sequentially over the four beams of the antenna and receiving Doppler shifted signals from the ground. The transmit-receive device 13 supplies the Doppler signal $f_\mathrm{d}$ on a 500 kc. carrier to the input of a sequencer 14 which is operated in synchronism with the beam switch signals to apply the received Doppler signal on individual beams to four separate trackers 15, 16, 17, and 18. The trackers are supplied input signals in sequence with the rotation of the beam of the antenna to produce a continuous output frequency corresponding to the center of the Doppler spectrum received from each beam position. These four frequencies are designated $f_\mathrm{FL}$, $f_\mathrm{FR}$, $f_\mathrm{BL}$ and $f_\mathrm{BR}$ and are applied to a combiner 19 where various algebraic combinations of these frequencies are obtained. The combiner 19 supplies signals to a ground speed and drift angle computer 21 which may indicate these quantities and also supply data to a navigation computer 22 for navigating the aircraft.

The trackers 15–18 are operated under the control of a search and track function generator 23 which operates to slew the trackers initially until they lock on a correct Doppler signal and after lock-on periodically to deviate the frequency of the tracking oscillators to check their operation. The generator 23 is under the control of a flag actuator circuit 24 which operates in response to the frequency $f_a$ which is defined as the difference between the sums of the left beams and the sums of the right beams. As shown in the referenced co-pending application of Cordry, the sum $f_{FL}-f_{FR}+f_{BL}-f_{BR}$ is equal to zero whenever all of the beam frequencies are correct. The flag actuator circuit 24 also controls the servos in the computer 21 to lock them in their last position whenever the data becomes unusable in the system and if the data is in error by a predetermined amount and exists for sufficiently long time, a flag indicator is raised to notify the pilot that the system is not operating properly.

Referring now to FIGS. 2A and 2B the search and track function generator will be described. The slew voltage orginates from a double base diode relaxation oscillator 81 which has a normal period of approximately one pulse per second, the output of which is applied to a monostable multivibrator 82 which generates a square voltage pulse of predetermined amplitude and duration for each oscillation of the oscillator 81. The pulses produced by the multivibrator 82 are integrated to produce a linear sweep voltage. This linear sweep voltage is developed in the integration capacitors of the tracking circuits so that the two tracking oscillator frequencies in both pairs of trackers are deviated by uniform increments in opposite directions during slewing. For this purpose the pulses from the multivibrator 82 are connected through an amplifier stage 79 to output terminal 83 which is connected to the slew input terminals for application to the integration capacitors. One such capacitor is shown at 90, the output of which is connected to a voltage controlled oscillator 100 forming part of one of the trackers 1–4 of FIG. 1.

Since for strong signals the slewing rate can be increased without danger of not recognizing a signal and locking on, the oscillation rate of the oscillator 81 is arranged to be increased to approximately 3 pulses per second for receiver AGC potentials above a predetermined level. For this purpose a FAST/SLOW circuit controlled by AGC input 84 is provided which terminates conduction in a transistor 85 at a fixed AGC level to alter the time constant in the circuit of oscillator 81 and thus increase its oscillation rate to 3 pulses per second for strong signals. The AGC voltage at terminal 84 varies from +8 volts at noise level signals to zero volts for strong signals. The emitter of the transistor 85 is biased at +6 volts by a zener diode and hence transistor 85 turns on when the AGC voltage is +6 or lower since the base will then be somewhat more negative than the emitter. Turn-on in transistor 85 closes the shunt impedance circuit through diode 80 to increase the charging rate in the time constant circuit of the oscillator diode 81 and hence increase its oscillation rate.

A +12 volt level on an alarm input line 86 enables the FAST/SLOW circuit of transistor 85 to operate in the FAST condition in response to AGC only when the alarm is on (i.e. when the trackers are searching). For this purpose the line 86 is energized by contacts (not shown) controlled by the alarm relay.

A recycle circuit is provided to repeat the slewing action in the event that a signal is not acquired in the first pass or to re-institute slewing if a trackable signal has been lost. For this purpose a negative pulse from the multivibrator 82 is applied via line 87 to charge a capacitor 88 which is connected to the base of a transistor 89 in a trigger circuit 91. The trigger circuit 91 is arranged to be triggered by a pulse coupled from the slew output terminal 83 over line 92 whenever the charge on the capacitor 88 reaches negative 6 volts. This level represents the end of the slew excursion and when the trigger circuit 91 is triggered a signal applied to the base of transistor 93 makes transistor 93 conductive and the current path between the collector and emitter electrodes is connected to discharge the integration capacitors. For this purpose a recycle output terminal 94 is connected to discharge capacitor 90 of the tracker oscillator 100. Once the capacitors of the tracker oscillators have discharged through the conducting path of transistor 93, the trigger circuit 91 returns transistor 93 to cut-off and the slew cycle is re-instituted. This action also discharges the capacitor 88 due to the conduction in transistor 89 while the trigger circuit 91 is in its regenerative conductive portion of the cycle.

As the capacitor 88 charges to a negative potential during the slew cycle and acquisition of four Doppler signals is achieved, the lock-on condition produces a correct value of $f_a$ which energizes the alarm relay to lower the alarm flag indication and a +12 volt signal on line 95 is derived from a set of contacts on the energized alarm relay (not shown). The positive 12 volt signal on line 95 is divided with respect to the negative 12 volt potential applied at terminal 96 to produce a voltage level of −4.3 volts on line 97. This negative 4.3 volts on line 97 in conjunction with the contact potential of diode 98 prevents the capacitor 88 from charging to a more negative level than −5 volts during tracking. Accordingly, when lock-on is achieved, the capacitor 88 remains at the −5 volt level and the trigger circuit 91 cannot be triggered by pulses on line 92. However, as soon as tracking is lost in any beam signal to the extent that $f_a$ exceeds a predetermined value, the alarm relay is deenergized and the positive 12 volt level on line 95 disappears, thereby permitting the capacitor 88 to continue to charge from the negative 5 volt level to negative 6 volts at which point the recycle triggering of trigger circuit 91 can occur. Thus, only a one volt change is required on capacitor 88 after the loss of a tracking signal to initiate recycling action in a relatively short interval after the signal is lost.

Various modifications in the disclosed circuit may be made without departing from the scope of the invention which is defined by the appended claims.

I claim:

1. In a Doppler radar system including a variable frequency tracking oscillator for generating a frequency related to the Doppler spectrum of the radar return signals, the frequency of said oscillator being controlled by a direct voltage input signal; slewing means for varying said direct voltage signal to cause said oscillator to sweep through a range of frequencies thereby to search for the Doppler return signal, comprising:

means for generating a periodic voltage, first integrating means for converting said periodic voltage to a voltage varying linearly from an initial level, the output of said first integrating means being supplied to said tracking oscillator to vary the frequency thereof, a trigger circuit connected to return the output of said first integrating means to said initial level upon actuation, second integrating means also receiving said periodic voltage and accumulating the same to develop a voltage of fixed magnitude for actuating said trigger circuit, and means responsive to the presence of a Doppler return signal for maintaining the output of said second integrating means at a constant magnitude less than that required to actuate said trigger circuit.

2. Apparatus as claimed in claim 1 with additionally means responsive to the strength of the received Doppler signal for changing the frequency of said periodic voltage.

3. In a Doppler radar system including a voltage controlled tracking oscillator for following Doppler frequencies in the radar return signal and means for generating an alarm signal upon failure of said tracking oscillator to follow the Doppler signal; slewing means for sweeping the frequency of said tracking oscillator through a range equivalent to the expected range of frequencies of said Doppler signal, comprising:
- a relaxation type oscillator for generating a square waveform voltage,
- first means for integrating said square wave voltage to generate a control voltage for said tracking oscillator varying with time from a first level determining the frequency at one extreme of the range of frequencies of said tracking oscillator to a second level determining the frequency at the opposite extremity of the range of frequencies of said tracking oscillator,
- a trigger circuit for causing the control voltage output of said first integrating means to return to said first level upon actuation, said circuit being actuated by a signal of fixed magnitude,
- second integrating means receiving said square waveform voltage for accumulating an actuating signal for said trigger circuit and
- means operative in the absence of an alarm signal for maintaining the output of said second integrating means at a magnitude proximate to the magnitude for actuating said trigger circuit, said means becoming inoperative in the presence of an alarm signal, thereby permitting said second integrating means to accumulate rapidly signal of sufficient magnitude to actuate said trigger circuit.

References Cited by the Examiner

UNITED STATES PATENTS

| | | | |
|---|---|---|---|
| 2,856,519 | 10/58 | Gray et al. | 331—14 |
| 3,086,201 | 4/63 | Smith et al. | 343—8 |
| 3,088,109 | 4/63 | Meyer | 343—9 |

CHESTER L. JUSTUS, *Primary Examiner.*

KATHLEEN CLAFFY, *Examiner.*